(12) United States Patent
Shin et al.

(10) Patent No.: US 7,350,990 B2
(45) Date of Patent: Apr. 1, 2008

(54) SHUTTER DEVICE FOR CAMERA LENS ASSEMBLY

(75) Inventors: Jeong-Kil Shin, Suwon-si (KR); Byung-Kwon Kang, Suwon-si (KR)

(73) Assignee: Samsung Electronics Co., Ltd., Maetan-Dong, Yeongtong-Gu, Suwon-Si, Gyeonggi-Do (KR)

(*) Notice: Subject to any disclaimer, the term of this patent is extended or adjusted under 35 U.S.C. 154(b) by 368 days.

(21) Appl. No.: 11/129,950

(22) Filed: May 16, 2005

(65) Prior Publication Data
US 2006/0147198 A1  Jul. 6, 2006

(30) Foreign Application Priority Data
Jan. 3, 2005  (KR) .................... 10-2005-0000109

(51) Int. Cl.
*G03B 9/08* (2006.01)
*G03B 9/02* (2006.01)

(52) U.S. Cl. ....................... 396/463; 396/508
(58) Field of Classification Search ............... 396/452, 396/457, 463–464, 493–496, 488–489, 461–468, 396/451, 501, 505, 508
See application file for complete search history.

(56) References Cited

U.S. PATENT DOCUMENTS

| | | | | |
|---|---|---|---|---|
| 5,325,142 A | * | 6/1994 | Depatie et al. | 396/449 |
| 5,335,036 A | * | 8/1994 | Aoshima | 396/484 |
| 6,443,635 B1 | * | 9/2002 | Matsumoto et al. | 396/463 |
| 6,705,776 B2 | * | 3/2004 | Watanabe | 396/463 |

FOREIGN PATENT DOCUMENTS

JP  09-080583  3/1997

* cited by examiner

*Primary Examiner*—Melissa Jan Koval
(74) *Attorney, Agent, or Firm*—Cha & Reiter, LLC

(57) ABSTRACT

In a shutter device for use with a camera lens assembly, the shutter device includes a shutter base, a shutter blade is rotatably mounted on the shutter base, a magnet movably coupled to the shutter base so as to enable rotation of the shutter blade, and a yoke extending lengthwise while facing the magnet wherein the movement range of the shutter base is limited within a length of the yoke. The zoom-in/zoom-out operation is enabled by moving only the shutter base, thus enabling a compact size fabrication of the camera lens assembly. The shutter blade is easily installed adjacent to a diaphragm, and the operational speed of the shutter blade is controlled by adjusting the structure of an electronic coil.

15 Claims, 3 Drawing Sheets

SHUTTER DEVICE FOR CAMERA LENS ASSEMBLY

CLAIM OF PRIORITY

This application claims the benefit under 35 U.S.C. 119(a) of an application entitled "Shutter Device For Camera Lens Assembly," filed with the Korean Intellectual Property Office on Jan. 3, 2005 and assigned Serial No. 2005-109, the entire contents of which are incorporated herein by reference.

BACKGROUND OF THE INVENTION

1. Field of the Invention

The present invention relates to a camera lens assembly. More particularly, the present invention relates to a shutter device for a camera lens assembly, which can be fabricated in a compact size and easily installed in a portable terminal.

2. Description of the Related Art

In general, a camera lens assembly includes a lens assembly, a diaphragm, and a shutter device in order to obtain high quality images of subjects. Recently, as digital cameras have become more pervasive, users frequently use cameras in daily life.

In addition, with the advancement of communication technology for mobile terminals, the mobile terminal provides users with a mobile banking and multimedia services, in addition to a basic voice communication and message transmission services. Besides the above, there are portable terminals equipped with camera lens assemblies having superior performance. Such portable terminals have made inroads into digital camera markets.

Early camera lens assemblies installed in portable terminals used an image sensor having 0.3 mega pixels. Currently, camera lens assemblies are equipped with a high-quality image sensor having more than 1 mega pixels. As quality of the image sensor becomes upgraded, the camera lens assembly installed in the portable terminal is equipped with a zoom function and a shutter device. However, if the zoom function and the shutter device are provided in the portable terminal, it is difficult to fabricate the portable terminal in a compact size.

The shutter device can be disposed in various positions of the camera lens assembly. Preferably, the shutter device, in particular, a shutter blade of the shutter device used for opening/closing an optical path is positioned adjacent to a diaphragm. This is to simultaneously perform a shutter action with respect to a center and a peripheral potion of the subject. If such a camera lens assembly has the zoom function and the diaphragm is moved during zoom-in and zoom-out operations, a shutter driving unit for driving the shutter blade of the shutter device must be moved together with the shutter blade. In addition, a driving force of a driving unit for performing the zoom-in and zoom-out operations must be increased.

Accordingly, a relatively large space must be provided in the portable terminal in order to install the shutter device and elements supporting the zoom function in the portable terminal. This makes it difficult to fabricate the portable terminal in a compact size.

SUMMARY OF THE INVENTION

Accordingly, the present invention has been made to reduce or overcome the above-mentioned problems occurring in the prior art and provides additional advantages, by providing a shutter device for a camera lens assembly, which can be easily installed in a portable terminal while allowing the portable terminal to be fabricated in a compact size.

In one embodiment, there is provided a shutter device for a camera lens assembly, the shutter device comprising: a shutter base. a shutter blade is rotatably mounted on the shutter base; a magnet movably coupled to the shutter base so as to enable rotation of the shutter blade; and a yoke extending lengthwise while facing the magnet, wherein a movement range of the shutter base is limited within a length of the yoke.

BRIEF DESCRIPTION OF THE DRAWINGS

The present invention will be more apparent from the following detailed description taken in conjunction with the accompanying drawings, in which.

DETAILED DESCRIPTION

Hereinafter, embodiments of the present invention will be described with reference to the accompanying drawings. For the purposes of clarity and simplicity, a detailed description of known functions and configurations incorporated herein will be omitted as it may make the subject matter of the present invention unclear.

Figure 1:
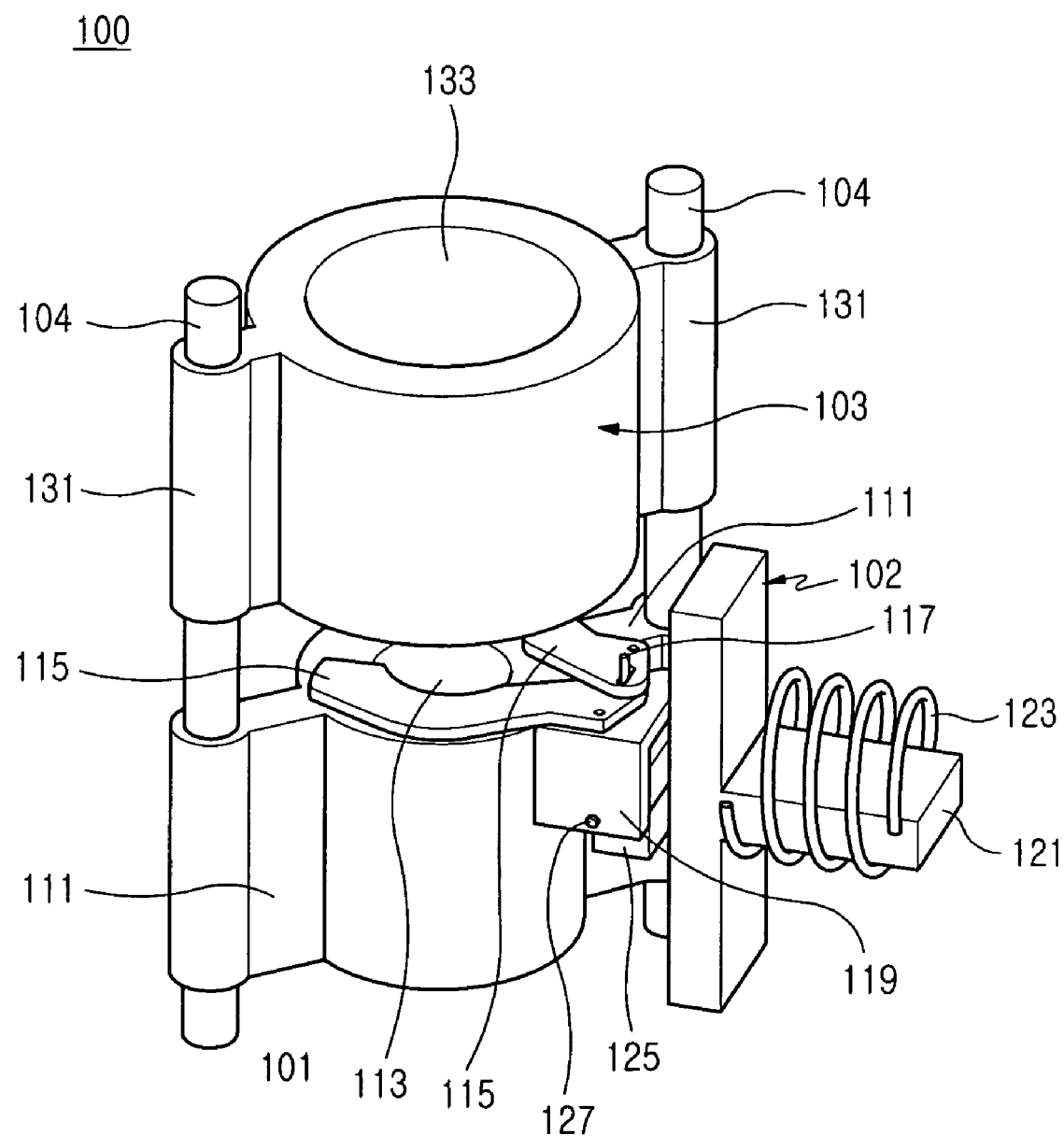
FIG. 1 is a perspective view illustrating a shutter device for a camera lens assembly according to one embodiment of the present invention.
Figure 2:
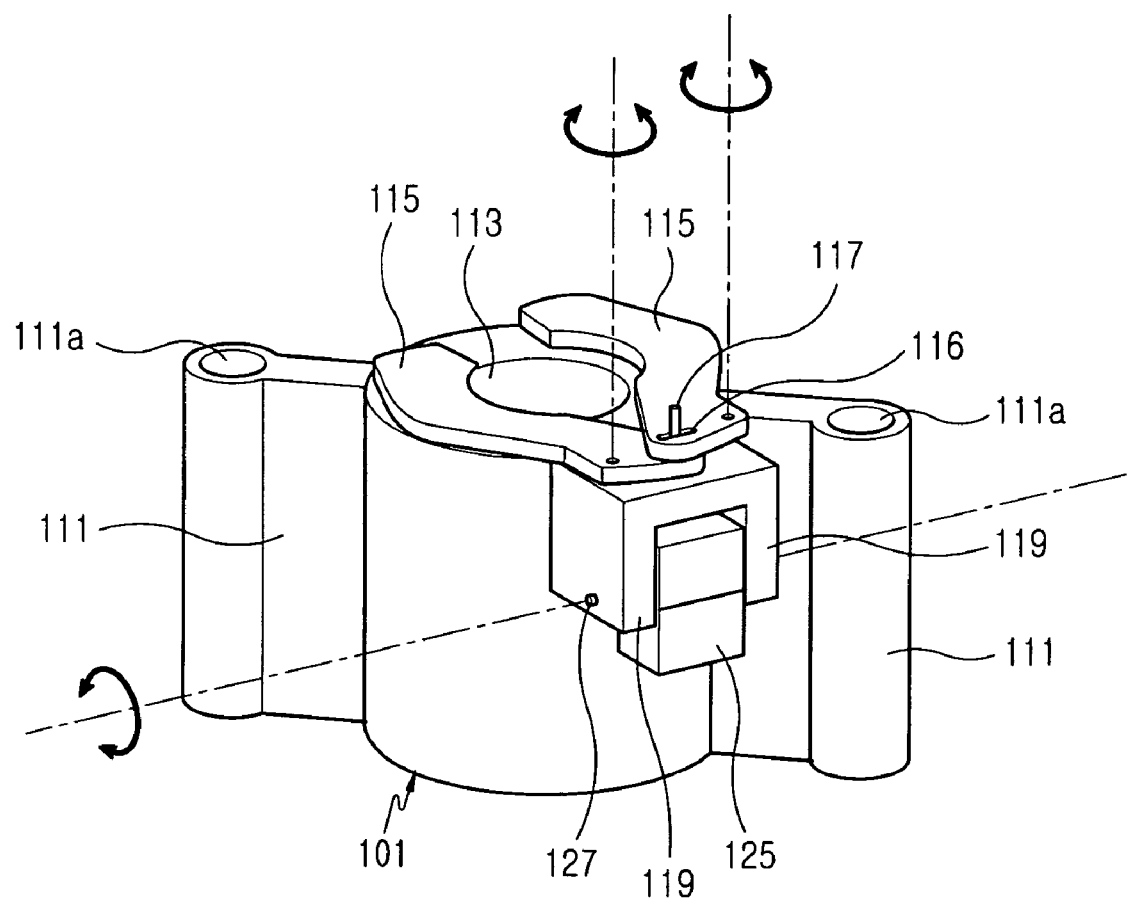
FIG. 2 is a perspective view illustrating a shutter base of a shutter device shown in FIG. 1.
Figure 3:
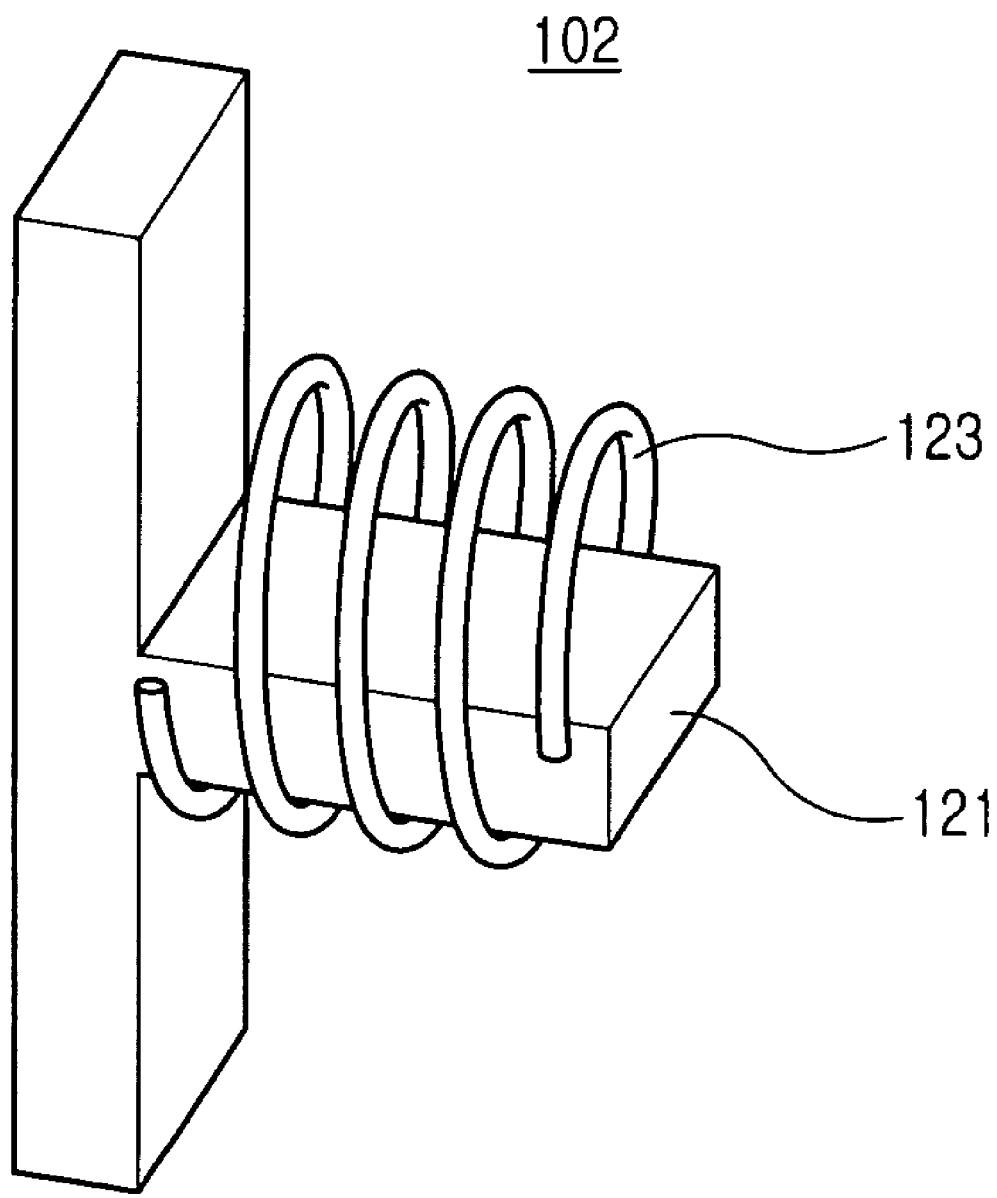
FIG. 3 is a perspective view illustrating a yoke of a shutter device shown in FIG. 1.

FIG. 1 is a perspective view illustrating a shutter device 100 for a camera lens assembly according to one embodiment of the present invention. FIG. 2 is a perspective view illustrating a shutter base 101 of the shutter device 100 shown in FIG. 1. FIG. 3 is a perspective view illustrating a yoke 102 of the shutter device 100 shown in FIG. 1.

As shown in FIGS. 1 to 3, the shutter device 100 of the camera lens assembly according to one embodiment of the present invention includes the shutter base 101 and a shutter blade 115. In addition, the shutter device 100 includes a magnet 125 and the yoke 102 for driving the shutter blade 115.

The shutter base 101 has a cylindrical shape with a predetermined length. It is formed at an inner portion thereof with an optical path 113 extending by passing through upper and lower ends of the shutter base 101. The shutter base 101 is provided at an outer peripheral surface thereof with a pair of support ribs 119 and at least one guide arm 111.

The support ribs 119 are aligned in opposition to each other so as to movably support the magnet 125. In addition, upper ends of the support ribs 119 are connected with each other, thereby providing a space for installing the shutter blade 115.

The guide arm 111 at the outer peripheral surface of the shutter base 101 has an end formed with a guide hole 111a extending lengthwise along the shutter base 101. The shutter base 101 is installed on the camera lens assembly in such a manner that it can slide lengthwise along the camera lens assembly. The guide arm 111 guides the sliding movement of the shutter base 101. Preferably, a pair of guide arms 111 are provided in order to stably support the sliding movement of the shutter base 101. A guide rail 104 is coupled with the guide hole 111a. That is, the guide rail 104 is slidably installed in the guide hole 111a so as to guide the sliding movement of the guide arm 111 and the shutter base 101.

A lens assembly 103 is slidably installed on the guide rail 104. The lens assembly 103 has a perforation hole 133, in which at least one lens (not shown) is installed, and a guide arm 131 slidably coupled with the guide rail 104. The lens assembly 103 has a shape similar to the shape of the shutter base 101. The zoom-in/zoom-out action is realized as the lens assembly 103 moves lengthwise along the guide rail 104.

At this time, a diaphragm (not shown) of the camera lens assembly is installed in the lens assembly 103 or the shutter base 101.

The shutter blade 115 and the magnet 125 are installed on the shutter base 101 having the above structure.

The shutter blade 115 is installed at an upper end of the shutter base 101. In detail, the shutter blade 115 is rotatably installed at upper ends of the support ribs 119. The shutter blade 115 has a pair of blade sections, which are symmetrically disposed in order to open/close an upper end of the optical path 113.

The shutter blade 115 rotates according to the movement of the magnet 125, thereby opening/closing the optical path 113. Elongated holes 116 are formed in the shutter blade 115 adjacent to a rotating axis of the shutter blade 115. The shutter device 100 has a driving pin 117 extending from the magnet 125. The driving pin 117 passes through the elongated holes 116 formed in the shutter blade 115. Accordingly, as the magnet 125 moves, the driving pin 117 is engaged with the elongated holes 116 formed in the shutter blade 115, thereby rotating the shutter blade 115.

The magnet 125 is aligned between the support ribs 119. In addition, the shutter device 100 includes a rotating pin 127 extending through the center of the magnet 125 so that the magnet 125 is rotatably coupled between the support ribs 119. Both ends of the rotating pin 127 are supported by the support ribs 119. Accordingly, an upper end or a lower end of the magnet 125 moves closely to or away from an outer peripheral surface of the shutter base 110. Thus, the driving pin 117 extending from the magnet 125 may move together with the magnet 125, thereby rotating the shutter blade 115.

The yoke 102 is aligned adjacent to the shutter base 101 while facing the magnet 125. The yoke 102 extends in a moving direction of the shutter base 101. The movement range of the shutter base 101 is limited within the length of the yoke 102. In detail, the movement range of the shutter base 101 is limited in such a manner that the magnet 125 does not deviate from the yoke 102.

A guide member 121 extends from one side of the yoke 102, so that the yoke 102 has a "T-like" shape. An electronic coil 123 is wound around the guide member 121. When current is applied to the electronic coil 123, an electric field is formed on the yoke 102.

The electric field formed on the yoke 102 may react with a magnetic field of the magnet 125, thereby moving the magnet 125. That is, polarity of the electric field formed on the yoke 102 may vary depending on polarity of current applied to the electronic coil 123. The electric field formed on the yoke 102 reacts with the magnetic field of the magnet 125, thereby moving the magnet 125.

Preferably, the magnet 125 includes a permanent magnet having an N-pole and an S-pole. Thus, attractive force is generated from one end of the magnet 125 and repulsive force is generated from the other end of the magnet 125 according to the polarity of the electric field formed on the yoke 102. The magnet 125 moves due to the attractive force and repulsive force between the yoke 102 and the magnet 12. In this manner, the driving pin 117 is moved together with the magnet 125, thereby rotating the shutter blade 115.

Consequently, even if the shutter base 101 moves according to the zoom-in/zoom-out action of the camera lens assembly, the magnet 125 still faces a part of the yoke 102, so that the user can operate the shutter device 100, if necessary.

As described above, according to the present invention, in order to improve performance of the camera lens assembly having the high-performance image sensor, the camera lens assembly is equipped with the zoom-in/zoom-out function and the shutter device. In addition, the shutter base has a shutter blade and a driving unit that rotates the shutter blade, which are provided separately. Thus, only the shutter base is moved during the zoom-in/zoom-out operation, thereby simplifying the structure of the driving unit. Accordingly, the camera lens assembly can be fabricated in a compact size so that the camera lens assembly can be installed in various electronic devices in addition to the portable terminal. Furthermore, elements installed on the shutter base in order to drive the shutter blade can be simplified, so that the shutter blade can be easily installed adjacent to the diaphragm. In addition, an operational speed of the shutter blade can be controlled by adjusting the structure of the electronic coil.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A camera lens assembly with a shutter device, the shutter device comprising:
   a movable shutter base adapted for slidable arrangement lengthwise along a camera lens assembly;
   a shutter blade rotatably mounted on the shutter base;
   a driving unit comprising a magnet movably coupled to the shutter base so as to enable rotation of the shutter blade; and
   a yoke extending lengthwise to the magnet, wherein said yoke further comprising a stop means for limiting a lengthwise movement of the movable shutter base to no more than a length of the yoke.

2. The camera lens assembly as claimed in claim 1, wherein the movable shutter base moves separately from the driving unit.

3. The camera lens assembly as claimed in claim 1, further comprising a guide member extending from one side of the yoke and including an electronic coil wound around the guide member, wherein the yoke forms a T-shaped structure together with the guide member.

4. The camera lens assembly as claimed in claim 3, wherein the magnet is rotatably coupled with the shutter base, and the magnet is moved by an attractive force and repulsive force created between the yoke and the magnet when current is applied to the electronic coil.

5. The camera lens assembly as claimed in claim 4, further comprising a driving pin extending from the magnet and passing through a hole in the shutter blade.

6. The camera lens assembly as claimed in claim 4, further comprising a rotating pin passing through the magnet, wherein both ends of the rotating pin are supported on the shutter base.

7. The camera lens assembly as claimed in claim 1, wherein a pair of shutter blades is provided symmetrically to each other, and an optical path is closed by the shutter blades when shutter blades are overlapped with each other and is opened when shutter blades are remote from each other.

8. A camera lens assembly with a shutter device, the shutter device comprising:
   a shutter base;
   a shutter blade rotatably mounted on the shutter base;
   a magnet movably coupled to the shutter base so as to enable rotation of the shutter blade; and
   a yoke extending lengthwise while facing the magnet, wherein movement range of the shutter base is limited within a length of the yoke, and
   a guide rail extending lengthwise and at least one guide arm, wherein the guide rail extends by passing through the guide arm so that the guide arm slidably moves along the guide rail.

9. A camera lens assembly with shutter device, the shutter device comprising:
   a shutter base;
   a shutter blade rotatably mounted on the shutter base;
   a magnet movably coupled to the shutter base so as to enable rotation of the shutter blade; and
   a yoke extending lengthwise while facing the magnet, wherein movement range of the shutter base is limited within a length of the yoke, and
   a pair of support ribs provided on the shutter base in opposition to each other, wherein the magnet is provided between the support ribs.

10. The camera lens assembly as claimed in claim 8, wherein the shutter blade is coupled at upper ends of the support ribs.

11. The camera lens assembly as claimed in claim 8, further comprising a guide member extending from one side of the yoke and including an electronic coil wound around the guide member, wherein the yoke forms a T-shaped structure together with the guide member.

12. The camera lens assembly as claimed in claim 11, wherein the magnet is rotatably coupled with the shutter base, and the magnet is moved by an attractive force and repulsive force created between the yoke and the magnet when current is applied to the electronic coil.

13. The camera lens assembly as claimed in claim 12, further comprising a driving pin extending from the magnet and passing through a hole in the shutter blade.

14. The camera lens assembly as claimed in claim 12, further comprising a rotating pin passing through the magnet, wherein both ends of the rotating pin are supported on the shutter base.

15. The camera lens assembly as claimed in claim 8, wherein a pair of shutter blades is provided symmetrically to each other, and an optical path is closed by the shutter blades when shutter blades are overlapped with each other and is opened when shutter blades are remote from each other.

* * * * *